United States Patent
Dastidar et al.

(10) Patent No.: US 12,086,083 B2
(45) Date of Patent: Sep. 10, 2024

(54) MULTI-TENANT AWARE DATA PROCESSING UNITS

(71) Applicant: XILINX, INC., San Jose, CA (US)

(72) Inventors: Jaideep Dastidar, San Jose, CA (US); David James Riddoch, Cambridgeshire (GB)

(73) Assignee: XILINX, INC., San Jose, CA (US)

( * ) Notice: Subject to any disclaimer, the term of this patent is extended or adjusted under 35 U.S.C. 154(b) by 103 days.

(21) Appl. No.: 17/892,989

(22) Filed: Aug. 22, 2022

(65) Prior Publication Data
US 2024/0061796 A1    Feb. 22, 2024

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................. G06F 13/20; G06F 2213/40
USPC .................. 710/15–16, 30, 33, 105
See application file for complete search history.

(56) References Cited

U.S. PATENT DOCUMENTS

| | | | | |
|---|---|---|---|---|
| 6,718,387 B1 * | 4/2004 | Gupta | ................. | H04L 67/1025 709/225 |
| 7,849,495 B1 * | 12/2010 | Huang | .................. | H04L 63/062 713/153 |
| 8,584,209 B1 * | 11/2013 | Borapura | ............ | H04L 63/0892 370/254 |
| 10,157,400 B1 * | 12/2018 | Georgi | ............... | G06Q 30/0227 |
| 10,673,439 B1 | 6/2020 | Ahmad et al. | | |
| 10,698,842 B1 | 6/2020 | Dastidar et al. | | |
| 11,063,594 B1 | 7/2021 | Ahmad et al. | | |
| 11,372,671 B2 * | 6/2022 | Koponen | ............ | H04L 41/0893 |
| 2003/0177391 A1 * | 9/2003 | Ofek | ....................... | H04L 63/10 713/176 |

OTHER PUBLICATIONS

Grant, Stewart, et al., "SmartNIC Performance Isolation with FairNIC Programmable Networking for the Cloud", Proceedings of the Annual Conference of the ACM Special Interest Group on Data Communication on the Applications,Technologies, Architectures, and Protocols for Computer Communication.Jul. 30, 2020. (Year: 2020).*

International Search Report and Written Opinion from PCT/US2023/019677 dated Jul. 24, 2023.

(Continued)

*Primary Examiner* — Idriss N Alrobaye
*Assistant Examiner* — Henry W Yu
(74) *Attorney, Agent, or Firm* — Patterson + Sheridan, LLP

(57) ABSTRACT

Embodiments herein describe creating tag bindings that can be used to assign tags to data corresponding to different tenants using a data processing unit (DPU) such as a SmartNIC, Artificial Intelligence Unit, Network Storage Unit, Database Acceleration Units, and the like. In one embodiment, the DPUs include tag gateways at the interface between a host and network element (e.g., a switch) that recognize and tag the data corresponding to the tenants. These tags are then recognized by data processing engines (DPEs) in the DPU such as AI engines, cryptographic engines, encryption engines, Direct Memory Access (DMA) engines, and the like. These DPEs can be configured to perform tag policies that provide security isolation and performance isolation between the tenants.

20 Claims, 5 Drawing Sheets

(56) References Cited

OTHER PUBLICATIONS

Grant, Stewart, et al., "SmartNIC Performance Isolation with FairNIC Programmable Networking for the Cloud", Proceedings of the Annual Conference of the ACM Special Interest Group on Data Communication on the Applications, Technologies, Architectures, and Protocols for Computer Communication, Jul. 30, 2020.

Kim, Gyuyeong, et al., "Network Policy Enforcement with Commodity Multiqueue NICs for Multitenant Data Centers", IEE Internet of Things Journal, vol. 9, No. 8, Apr. 15, 2022.

Jiaxin Lin, et al., "PANIC: A High-Performance Programmable NIC for Multi-tenant Networks".

Wang, Tao, et al., "Isolation mechanisms for high-speed packet-processing pipelines", Cornell University Library, Mar. 2, 2022.

* cited by examiner

MULTI-TENANT AWARE DATA PROCESSING UNITS

TECHNICAL FIELD

Examples of the present disclosure generally relate to a data processing unit (DPU) that assigns different tags to different tenants using the DPU. The DPU can include multiple data processing engines (DPEs) that can enforce different polices based on the tags to, e.g., ensure tenant isolation (prevent nosy neighbors) and satisfy performance requirements (prevent noisy neighbors).

BACKGROUND

Current acceleration devices such as Smart network interface cards/controllers (SmartNICs) include different components such as I/O gateways, processor subsystems, network on chips (NoCs), storage and data accelerators, data processing engines, and programmable logic (PL). In prior techniques, these different components in the acceleration devices are treated as separate monolithic components that simply pass work or transform data before forwarding on to the next component. At best, these components either interface with each other over a common bus protocol such as Advanced eXtensible Interface (AXI), or have a protocol bridging function that converts one component's protocol, such as PCIe, onto another component's protocol, such as AXI.

When transmitting data from one component to the next, properties or attributes of the data unique to one component, or unique to a tenant in service of a function for that tenant, are not propagated on to the next component such that the two components are opaque to each other even though both components may be performing specific functions in service of the same tenant. Stated differently, the different components in the same accelerator device act independently of each other even though they may perform interrelated operations. Some existing techniques involve software intervention (e.g., a hypervisor or component firmware) to regain attributes unique to a tenant across various components (although the bridge may create an opaque boundary) such that the receiving component can re-acquire a tenant's properties through that intervening software every time one component receives work or data from another component. However, this software intervention creates overhead, particularly when it comes to enabling services across components for multiple tenant functions. Furthermore, some tenants do not trust hypervisors or other software entities intervening (as is the case in bare-metal deployments) on their behalf.

SUMMARY

One embodiment describes a multi-tenant aware DPU that includes a first tag gateway configured to couple to a host, a second tag gateway configured to couple to a network, wherein the first and second tag gateways are configured to assign different tags to data received from different tenants, and a plurality of DPEs configured to enforce different tag policies, based on the different tags, when processing the received data.

Another embodiment described herein is multi-tenant aware DPU, a first tag gateway coupled to a local interface of the DPU, a second tag gateway coupled to a remote interface of the DPU, wherein the first and second tag gateways are configured to assign different tags to data received from different tenants at the DPU, and a plurality of data processing engines (DPEs) configured to enforce different tag policies, based on the different tags, when processing the received data in order to (i) isolate data received from different tenants and to (ii) ensure performance standards for the tenants are met.

Another embodiment described herein is a method that includes receiving data from a plurality of tenants at a first tag gateway of a data processing unit (DPU), assigning different tags to the data received from different ones of the plurality of tenants, and enforcing different tag policies as the tagged data from the plurality of tenants is processed by data processing engines (DPEs) in the DPU.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
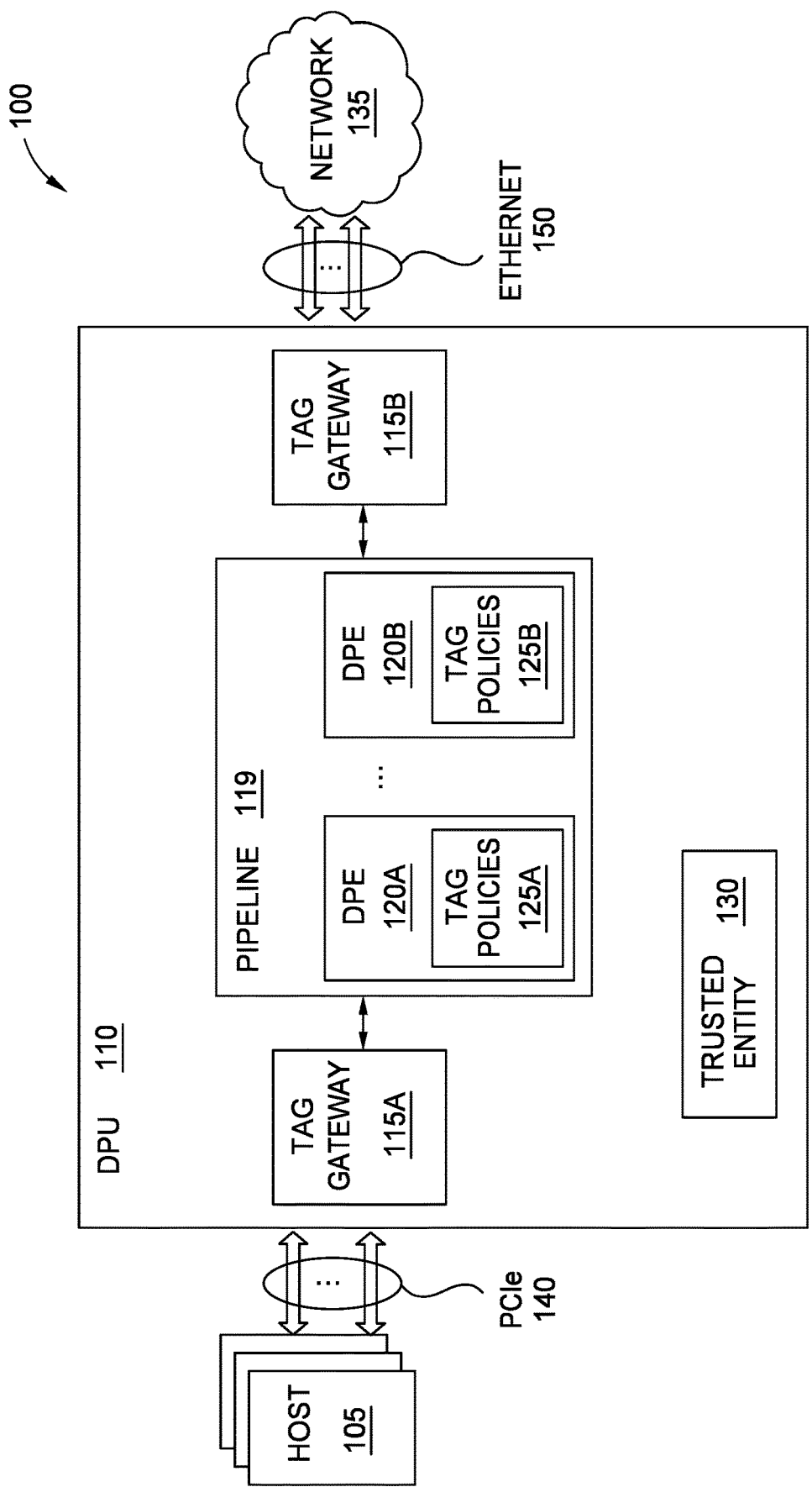
FIG. 1 illustrates a system that includes a multi-tenant aware DPU, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe creating tag bindings that can be used to assign tags to data corresponding to different tenants using a data processing unit (DPU) such as a SmartNIC, Artificial Intelligence Unit, Network Storage Unit, Database Acceleration Unit, and the like. In one embodiment, the DPUs include tag gateways at the interface between a host and a network element (e.g., a switch) that recognize and tag the data corresponding to the tenants. These tags are then recognized by data processing engines (DPEs) in the DPU such as AI engines, cryptographic engines, encryption engines, Direct Memory Access (DMA) engines, and the like. These DPEs can be configured to perform tag policies that provide security isolation and performance isolation between the tenants. For example, one of the tenants cannot access data for another tenant (e.g., prevents a nosy neighbor) or cannot take more than its share of the resources in a DPE (e.g., prevents a noisy neighbor). In this manner, the tag bindings can create an end-to-end binding through the DPU where different DPEs in the DPU enforce a coordinated tag policy for a particular tenant.

FIG. 1 illustrates a system 100 that includes a multi-tenant aware DPU 110, according to an embodiment. Specifically, the system 100 illustrates connecting the DPU 110 to a host 105 and a network 135. For example, the host 105 may include one or more processors (e.g., a processor complex) and memory that communicate with the DPU 110 using any number of PCIe connections 140.

The network 135 can include any number of network elements (e.g., one or more switches) that are coupled to the DPU 110 by Ethernet connections 150. In one embodiment, the DPU 110 may be a SmartNIC where the host 105 uses DPEs 120 in the DPU 110 to perform data processing tasks that would otherwise be performed by processors on the host 105. The DPU 110 can be an AI accelerator unit to perform AI or machine learning tasks, a cryptography unit to encrypt and decrypt data transmitted between the host 105 and the network 135, a Network Storage Unit, a Database Acceleration Unit for a cloud computing environment, and the like.

In one embodiment, the connection between the DPU 110 and the host 105 is a local interface while the connection between the DPU 110 and the network 135 is a remote interface. These different interfaces can use different communication protocols. For example, the local interface between the host 105 and the DPU 110 can use PCIe, Compute Express Link (CXL), or Cache Coherent Interconnect for Accelerators (CCIX). The interface between the DPU 110 and the network 135 can use Infiniband or Ethernet.

The DPU 110 includes tag gateways 115 that tag data created by different tenants that share the DPU 110. For example, multiple hosts 105 may be attached to the DPU 110 at different physical ports, where each host 105 is a different tenant. In another embodiment, a particular host 105 may have multiple VMs which are each treated as different tenants (e.g., execute different applications or are associated with different customers in a cloud computing environment or a data center). Thus, a tenant can be a physical computing system (e.g., a host 105), a virtual machine or container, a particular application, or customer in a data center environment. As such, the tenants can correspond to physical components (e.g., different ports) or can be logical constructs (e.g., different customers that use the same virtual machine or the same host 105).

The tag gateway 115A receives data from the host 105 and uses attributes in the data to tag the data. Stated differently, the tag gateway 115A can use identifying attributes in received data to determine the data is from a particular tenant and then assign a tag to that data corresponding to the identified tenant. For example, the gateway 115 may use an ID in the data to identify the tenant and provide a tag. In another embodiment, the gateway 115 may evaluate the source of the data (e.g., the host or VM that sent the data, an application ID, a port the data was received on, etc.) to identify the tenant and provide a tag. In yet another embodiment, the gateway 115 may evaluate the destination of the data or an address range to identify the tenant and tag the data.

In this embodiment, the DPU 110 includes a trusted entity 130 which may be the only entity in the DPU 110 that is permitted to configure the tag gateway 115A. The DPU 110 can include firewalls that ensure only the trusted entity 130 can configure the tag gateway 115A to create tag bindings that link the attributes in the data (e.g., an ID, source information, destination information, etc.) to a particular tag. Thus, nefarious, external actors cannot gain access to the tag gateway 115 to change or spoof the tag bindings. That is, the tags are non-spoofable and cannot be changed.

In one embodiment, the DPU 110 includes a full hardware firewall so that the tags assigned by the tag gateways 115 are trusted. That is, no other hardware, firmware, or software entity in the DPU 110 is able to change the tags once set by the tag gateways 115. However, in another embodiment, the DPU 110 can support trusted and untrusted tags. Each of the downstream hardware components in the DPU 110 (e.g., the DPEs 120) can distinguish between a trusted and untrusted tag.

In one embodiment, untrusted tags are assigned to tenants who accept a lower level of service (e.g., at a lower or no cost) and also accept being subject to noisy neighbor or nosey neighbor effects. For example, a cloud service provider may offer extremely low or no cost level of service to educational institutions. These educational institutions receive computational, storage, and networking resources for students to run their research applications. The educational institution tenant is assigned an untrusted tag which offers best effort (or left over computational capacity) but without the same level of data isolation as tenants assigned trusted tags. In another example, untrusted tags may also be used in the DPU to bypass cryptographic engines/accelerators thus saving the cloud service provider power and cost in offering these services to the educational institution tenant.

Once tagged, the data is provided to a pipeline 119 that includes a plurality of DPEs 120. The DPEs 120 can be AI engines/accelerators, database engines/accelerators, cryptography engines/accelerators, compression engines/accelerators, and the like. The DPEs 120 can be formed from hardened circuitry, programmable logic (PL), or a combination of both.

In one embodiment, the DPEs 120 in the DPU 110 may all be the same type of engine or accelerator. For example, the DPU 110 may be designed to accelerate AI tasks associated with data transmitted between the host 105 and the network 135. In that case, all the DPEs 120 may be AI engines. That is, the DPEs 120 may be homogenous. Alternatively, the DPEs 120 may be heterogeneous where DPE 120A may be a DMA engine, DPE 120B may be a cryptography engine, and so forth.

In FIG. 1, the DPEs 120 are arranged in a pipeline 119 so that data can be sequentially processed by multiple DPEs 120, but this is just one example. For example, data for one tenant may be passed through DPE 120A and 120B while data for another tenant may be processed only by DPE 120A, but not by DPE 120B. In generally, the DPU 110 can have any number of DPEs 120 where a particular tenant may use all, a subset, or none of the DPEs 120 when its data is transmitted through the DPU 110.

The DPEs 120 include tag policies 125 defining how the differently tagged data should be processed by the DPE 120. Stated differently, the tag policies 125 indicate how the DPE 120 should process the data for each of the tenants that may use the DPU 110. For example, the tag policy 125A may indicate that data tagged for Tenant A should be able to use, at a maximum, 25% of the hardware resources in DPE 120A. Thus, if the DPE 120A receives a burst of traffic from Tenant A, even if it has available, unused resources, the tag policy 125A prevents the DPE 120 from providing more than 25% of its resources to process Tenant A's traffic. As such, if a short time later the DPE 120A receives a burst of traffic from Tenant B which should be given up to 75% of the resources of DPE 120A, those resources are immediately available to Tenant B. In this example, the tags and tag policies 125 prevent a noisy neighbor (e.g., Tenant A) from using resources that should be used for Tenant B.

Moreover, the tag policies 125 can provide tenant isolation where the tenants are unable to access each other's data. For example, the DPU 110 may include memory (not shown) which stores the tenants' data. If while processing data for Tenant B, the DPE 120 attempts to access data for Tenant A, the tag policy can stop the attempt. This prevents a nosy neighbor situation where one tenant may attempt to access data for another tenant on the shared resource (the DPU 110 or the hardware components in the DPU 110). However, the tag policies 125 may indicate that some tenants can access the data for other tenants. For example, Tenants A and B may be virtual machines used by the same customer, while Tenant C may be a virtual machine for a different customer. The tag policies 125 may permit Tenants A and B to share data with each other, but not permit Tenants A and B from accessing Tenant C's data, and vice versa.

The tag policies 125 for the DPEs 120 may be the same or different. For example, tag policy 125A for DPE 120A may be different than the tag policy 125B for the DPE 120B. For example, the tag policies 125 may give Tenant A a larger share of the hardware resources in DPE 120A than the DPE 120B.

The trusted entity 130 may also be tasked with configuring the tag policies 125. In one embodiment, only the trusted entity 130 can configure and change the tag policies 125. This prevents a nefarious actor from changing the security and performance isolation established by the tag policies 125. Moreover, while FIG. 1 illustrates the trusted entity 130 as part of the DPU 110, in other embodiments, the trusted entity 130 may be external to the DPU 110 but have a verified communication path to the DPU 110 in order to perform the functions described above.

The remote interface of the DPU 110 includes a tag gateway 115B which tags data received from the network 135. Like with the local interface and the tag gateway 115A, the gateway 115B can use physical attributes to identify the tenants and tag the data such as which port the data was received on. Alternatively or additionally, the gateway 115B can use attributes in the data such IP addresses, source/destination information, traffic flow identifiers and the like, to tag the received data. Thus, the gateway 115B can perform a logical tagging where different traffic flows received on the same port can be identified as different tenants.

In general, the tagging performed by the gateways 115 and the tag policies 125 create an end-to-end binding for each tenant as data flows from the host 105 to the network 135 and from the network 135 to the host 105. Further, data traveling in opposite directions may be associated with the same tenant, and thus, be assigned the same tag despite the interfaces for the DPU 110 using different protocols. For example, a particular traffic flow received at the DPU 110 from the network 135 may be part of the same tenant as data received at the DPU 110 from a host 105. The tag bindings can link different attributes to the same tag. For example, the tag gateway 115A may tag all data with a particular ID defined by the PCIe protocol with Tag A while the gateway 115B tags all data with a particular IP address with Tag A. Thus, while the data for the same tenant may be communicated to the DPU 110 using different communication protocols, the tag bindings in the tag gateways 115 can use different attributes to nonetheless assign the data the same tag, thereby indicating the data is for the same tenant. Thus, data for the same tenant can be assigned the same tag regardless which direction the data flows through the DPU 110.

Figure 2:
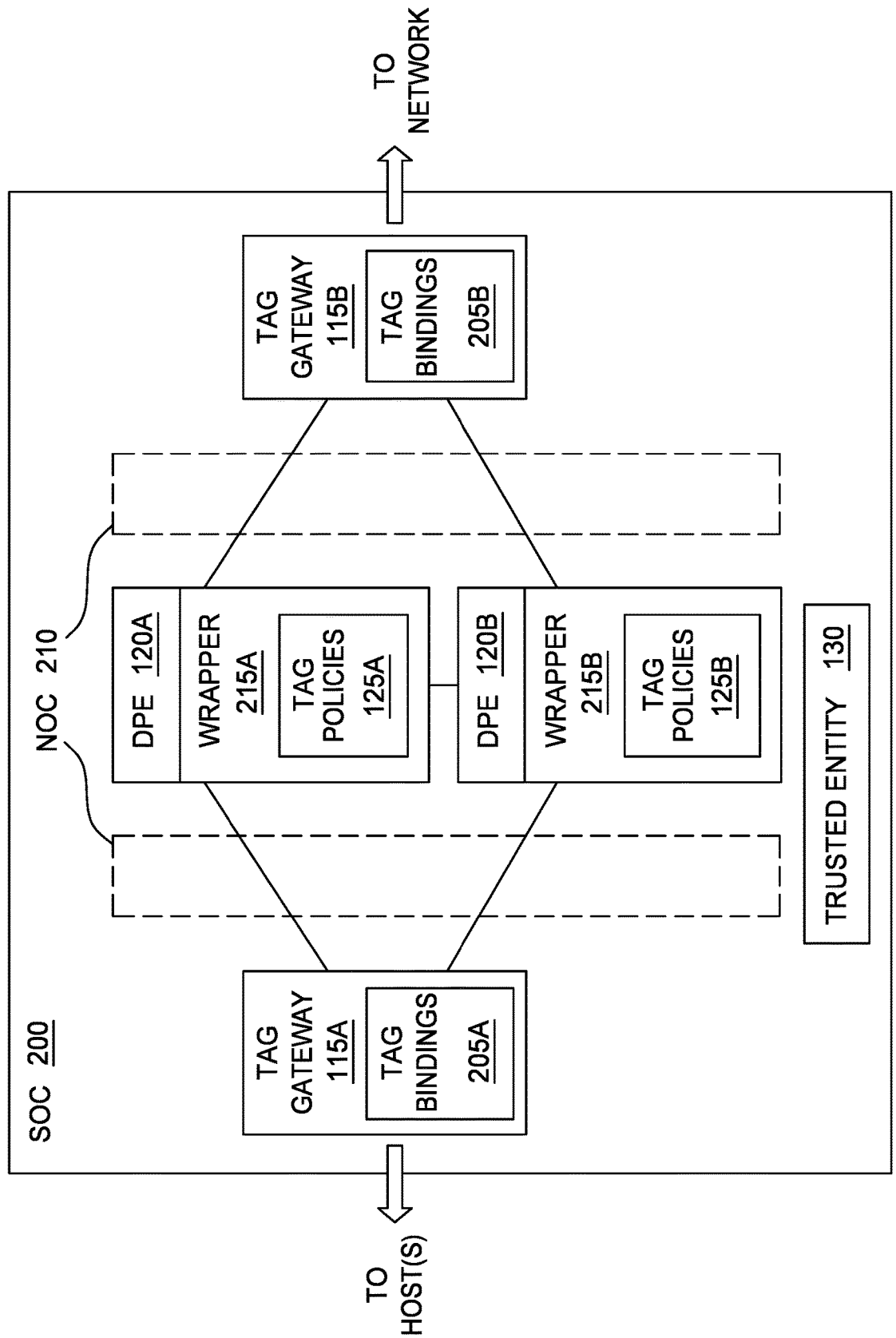
FIG. 2 illustrates a DPU implemented as a system on a chip, according to an embodiment.

FIG. 2 illustrates a DPU implemented as a system on a chip (SoC) 200, according to an embodiment. The SoC 200 (e.g., an integrated circuit (IC)) can include the tag gateways 115, the DPEs 120, and the trusted entity 130. In addition, FIG. 2 illustrates tag bindings 205 within the tag gateways 115 which can be generated by the trusted entity 130. As discussed above, the tag bindings 205 can associate or link attributes in the data received by the SoC 200 from the host or the network to a particular tag. For example, the tag gateway 115 can identify an ID, source, destination, address space, IP address, and the like and use this attribute to index into the tag bindings 205 to identify a tag for the data. In one embodiment each tenant may be assigned a different tag, although different traffic flows may be assigned the same tag if these flows are part of the same tenant.

The tag bindings 205A may include different attributes than the tag bindings 205B since the interfaces used by the gateways 115A and 115B may use different communication protocols—e.g., PCIe, CXL or CCIX for gateway 115A and Ethernet for gateway 115B.

In this example, the DPEs 120 include wrappers 215A, 215B (e.g., hardware circuits) that enforce the tag policies 125A, 125B, respectively. For example, before processing the received data at a DPE 120, the data first passes through the corresponding wrapper 215A or 215B. The corresponding wrapper 215A, 215B can then enforce the policy for the tagged data, such as ensuring the DPE 120 does not access differently tagged data, or ensuring the DPE 120 does not assign more resources than it should to process the data. For example, if the corresponding wrapper 215A, 215B determines the DPE 120 will expend more resources than is allowed to process the received tagged data (e.g., the corresponding wrapper 215A, 215B receives a burst of data from a particular tenant), the corresponding wrapper 215A, 215B can block a portion of the data (or throttle the data) so that the DPE 120 does not expend more resources than it should to process the data according to the tag policies 125A, 125B.

However, using the wrappers 215A, 215B to enforce the tag policies 125A, 125B, respectively, is just one example. In other embodiments, the DPEs 120 can include tables that store the tag policies 125A, 125B. The DPEs 120 may use the tags to index into the tables to identify the particular policy for that tag.

In yet another embodiment, the trusted entity 130 can statically assign DPEs 120 to particular tenants. For example, Tenant A may be assigned two DPEs while Tenant B is assigned four DPEs. The tags can be used to route only Tenant A's data to its two assigned DPEs while only Tenant B data is routed to its four DPEs. In another example, the SoC 200 may include multiple parallel pipelines of DPEs where each pipeline may be statically assigned to a particular tenant—e.g., Tenant A's data is processed only by a first pipeline, Tenant B's data is processed only by a second pipeline, and Tenant C's data is processed only by third and fourth pipelines.

The SoC 200 also includes a network on chip (NoC) 210 which facilitates communication between the gateways 115 and the DPEs 120, and between DPEs 120. Although not shown, the NoC 210 may include a tag policy for providing data isolation and satisfying performance requirements for the tagged tenant data. However, the NoC 210 is optional.

While FIG. 2 illustrates a SoC implementation of the DPU, which can include a single IC, in other embodiments, the DPU may be implemented using multiple ICs. For example, the DPU may include an anchor die that includes some of the hardware components illustrated in FIG. 2 as well as chiplets that include the remaining hardware components.

Figure 3:
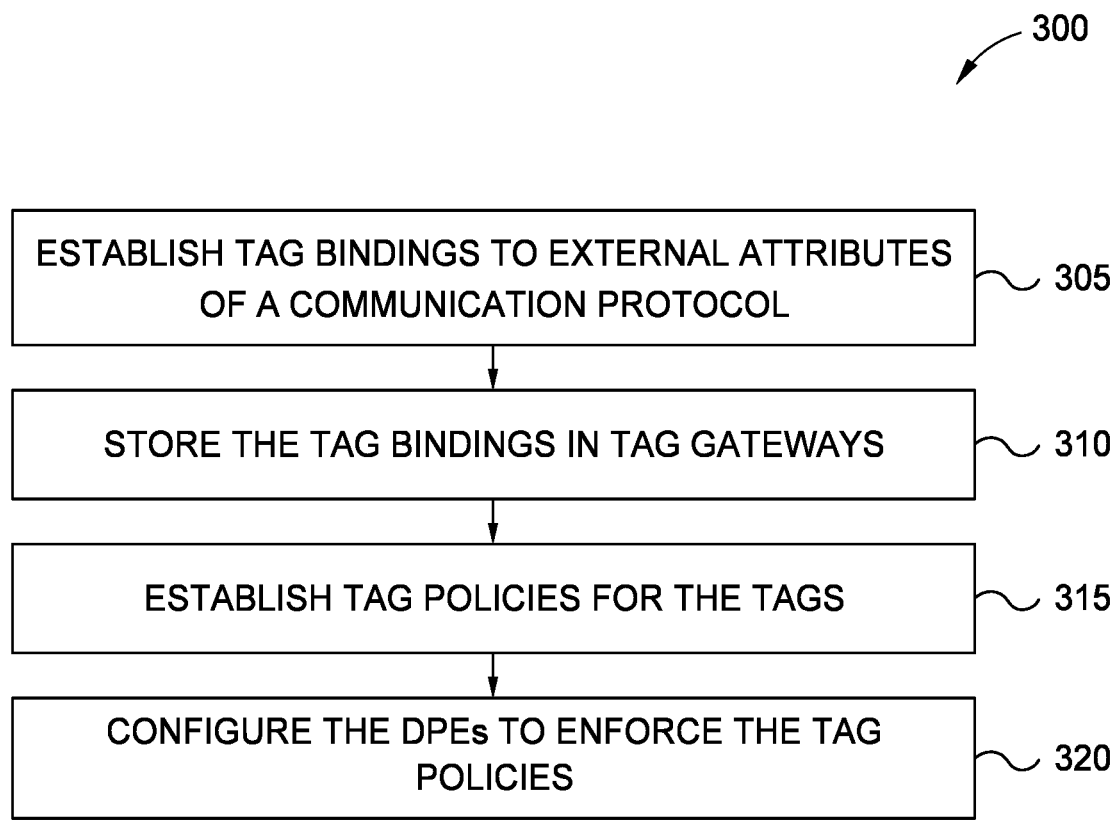
FIG. 3 is a flowchart for establishing end-to-end bindings in a DPU, according to an embodiment.

FIG. 3 is a flowchart of a method 300 for establishing end-to-end bindings in a DPU, according to an embodiment. At block 305, a trusted entity (e.g., the trusted entity 130 in FIG. 1) establishes tag bindings to external attributes of a communication protocol. As mentioned above, the DPU can have a local interface that uses a first communication protocol (e.g., PCIe or CXL) to communicate with a host and a remote interface that uses a second communication protocol (e.g., TCP/IP or UDP) to communicate with a network device, such as a switch.

Because of the different communication protocols, the trusted entity may generate different tag bindings that rely on different attributes. Thus, the tag bindings can be customized depending on the interfaces where they will be deployed.

At block 310, the trusted entity stores the tag bindings in the tag gateways in the DPU.

At block 315, the trusted entity establishes tag policies for the tags. The trusted entity may generate tag policies for every hardware component in the DPU that will process tenant data. The tag policies can establish data isolation requirements for each tag (i.e., each tenant). The isolation requirements can enable security isolation between the tenants and/or performance isolation between the tenants.

At block 320, the trusted entity configures the DPEs to enforce the tag policies. This can be done in a variety of ways such as using wrappers, tables, or statically assigning certain DPEs to particular tagged data. Further, the embodiments herein are not limited to providing tag policies to DPEs, but can also be provided to NoCs or memory controllers in the DPU.

Figure 4:
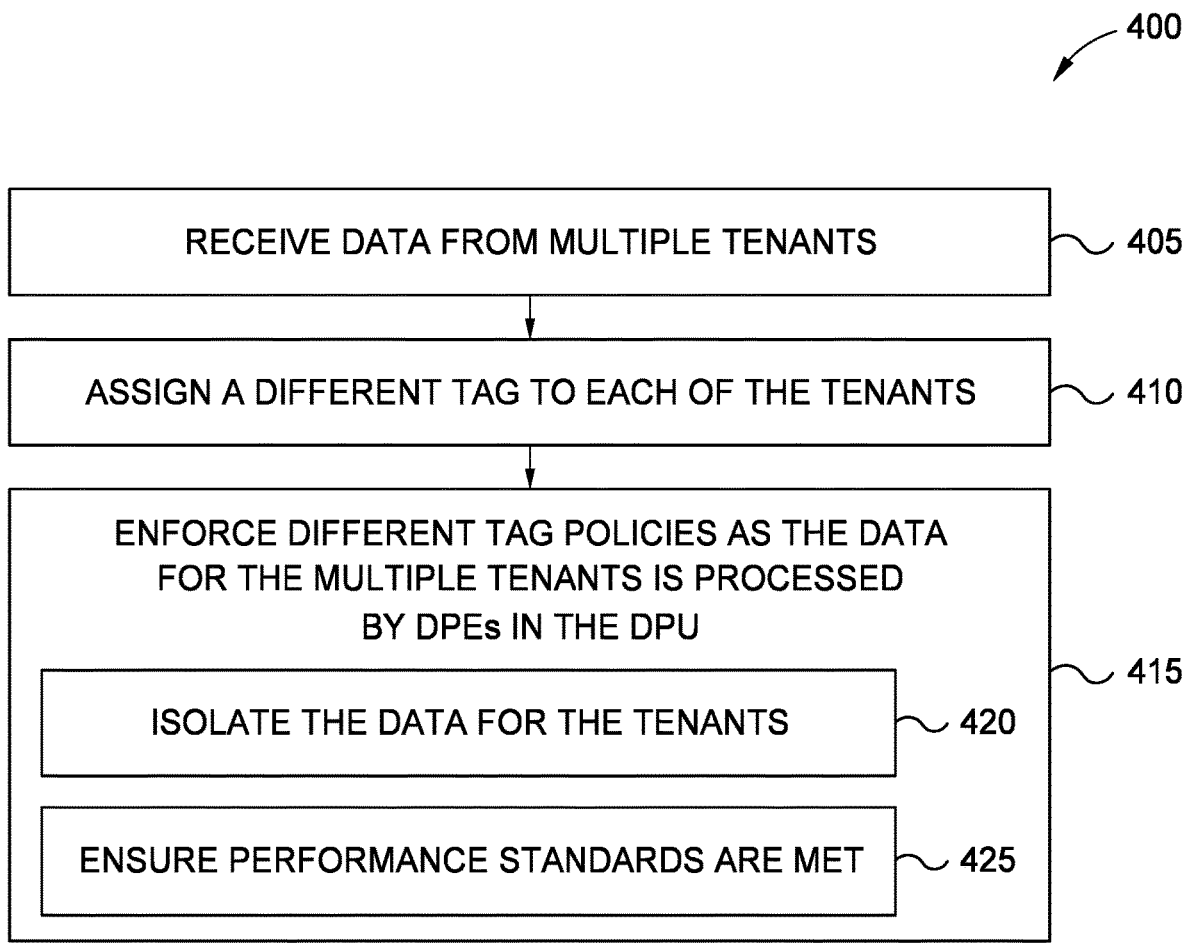
FIG. 4 is a flowchart for assigning tags to tenants and using those tags to process the data at the DPEs in a DPU, according to an embodiment.

FIG. 4 is a flowchart of a method 400 for assigning tags to tenants and using those tags to process the data at the DPEs in a DPU, according to an embodiment. At block 405, the DPU receives data from multiple tenants. In one embodiment, the data includes data packets, but this can depend on the communication protocol.

In one embodiment, the DPU receives packets on two different interfaces. One interface may be a local interface connected to one or more host computing systems (e.g., the host 105 in FIG. 1). Another interface may be a remote interface connected to one or more network devices part of a network (e.g., the network 135). The network could be a local area network (LAN) such as the datacenter network of a Cloud Service Provider (CSP) or a wide area network (WAN) such as the Internet. In one embodiment, the interfaces use different communication protocols, such as PCIe or Ethernet.

At block 410, the DPU assigns a different tag to each of the tenants that transmit data to the DPU. For example, tag gateways in the DPU can evaluate attributes in the received data to identify which tenant transmitted the data. As mentioned above, a tenant can be a physical computing system, a virtual machine or container, a particular application, or a customer of a data center environment. As such, the tenants can correspond to physical components (e.g., different ports) or can be logical constructs (e.g., different customers that use the same virtual machine or the same host). The data can include attributes such as IDs, source/destination addresses, port numbers, memory addresses, and the like, which a tag gateway can use to identify a particular tag for the data, which corresponds to the tenant transmitting the data.

The tag gateway can then append the tag to the data. The DPU can use a variety of different communication protocols to transmit the data internally. Regardless of the protocol, the DPU can ensure the tag remains with the data so that internal hardware components such as the DPEs, DMA controller, memory controllers, NoC, etc. can identify the tags and perform some action on the data based on the tag that accompanied the data.

At block 415, the hardware components in the DPU (e.g., DPEs) enforce different tag policies as the data for the multiple tenants is processed. For example, the DPEs may include wrappers or policy tables that use the tag assigned at block 410 to enforce a corresponding tag policy. In one embodiment, the tag policy may be defined to prevent nosy and noisy neighbors (i.e., tenants).

Block 415 can include two sub-blocks to prevent nosy and noisy neighbors. At block 420, the DPEs isolate the data for the tenants. That is, when processing data for Tenant A, the tag policy may prevent the DPE from accessing data for another tenant. Or the tag policy may indicate that Tenant A can access the data for Tenant B but not for Tenant C.

At block 425, the DPEs ensure performance standards are met for the tenants. For example, the DPEs may prevent Tenant A from using more than 33% of its hardware resources, even if there are current unused hardware resources in the DPE. That way, if the DPE receives data for a different tenant, the DPE has available hardware resources. Different strategies for handling nosy and noisy neighbors are discussed in FIGS. 5 and 6.

Figure 5:
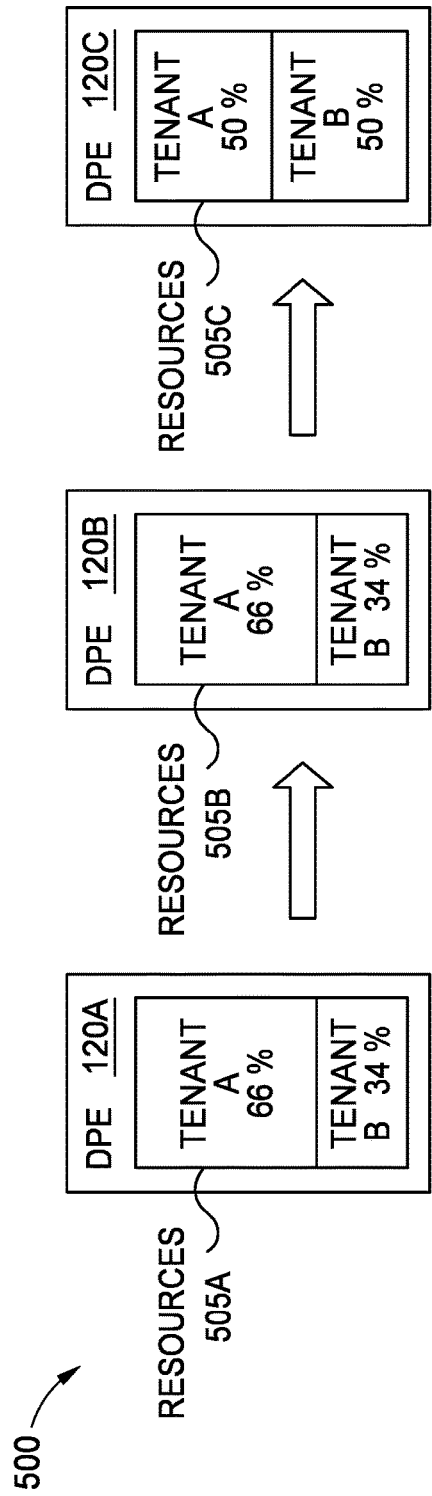
FIGS. 5 and 6 illustrate sharing resources between tenants using the tags, according to several embodiments.
Figure 6:
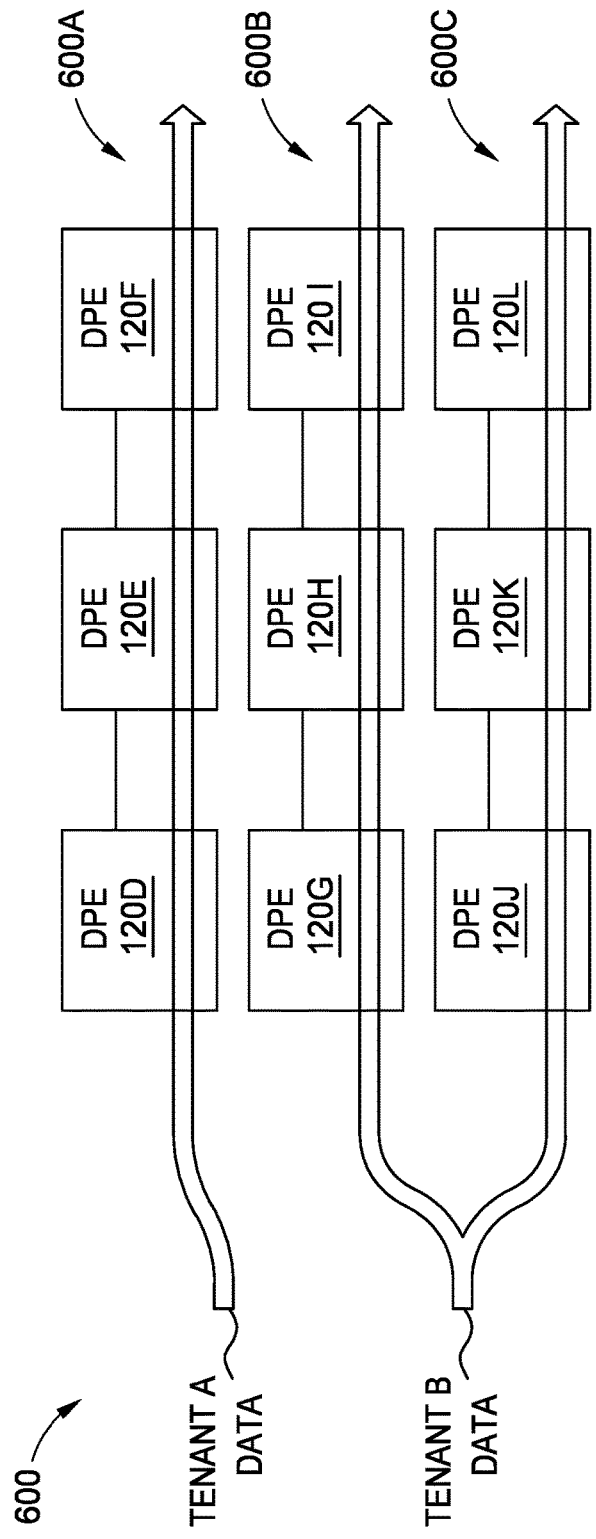

FIGS. 5 and 6 illustrate sharing resources between tenants using the tags, according to several embodiments. FIG. 5 illustrates a pipeline 500 of DPEs that use tag policies to ensure the DPEs can met desired performance standards for the tenants. The pipeline 500 includes DPEs 120A-C which have respective hardware resources 505A-C. The DPE 120A guarantees that Tenant A can access, at a maximum 66% of its hardware resources 505A while Tenant B can access at most 34% of the hardware resources 505A. The DPE 120B guarantees that Tenant A can access, at a maximum 66% of its hardware resources 505B while Tenant B can access at most 34% of the hardware resources 505B. The DPE 120C guarantees that Tenant A can access, at a maximum 50% of its hardware resources 505C while Tenant B can access at most 50% of the hardware resources 505C. These hardware allotments can be set by the tag policies. Notably, the tag policies for each of the DPEs do not have to be the same, since the DPE 120C allocates its hardware resources 505C differently to Tenant A and B than the DPEs 120A and 120B.

Ensuring a tenant cannot exceeds its maximum allocation of resources in a DPE prevents the noisy neighbor problem where one tenant may use most or all of the resources in a DPE and then when data for another tenant arrives at the DPE, it does not have any available hardware resources, thereby forcing that tenant's data to wait even if the tenant may have higher priority data. However, by using tags to identify the tenant data, the hardware resources 505 can be partitioned according to priority thereby ensuring the DPEs have available resources for the different tenants.

Although not shown, the nosy neighbor can be solved by the DPEs 120 having firewalls or control policies that prevent hardware resources processing Tenant A data from accessing Tenant B's data, and vice versa.

FIG. 6 illustrates multiple DPE pipelines 600A-C with respective DPEs. That is, the pipeline 600A includes DPEs 120D-F, the pipeline 600B includes DPEs 120G-I, and the pipeline 600O includes DPEs 120J-L. In one embodiment, the DPEs in the pipelines 600 are the same, such that the pipelines 600 may perform the same task (e.g., a digital signal processing task or a machine learning task). That is, each pipeline 600 may include the same three DPEs (which may be three of the same type of DPE or a combination of different types of DPEs).

Instead of dividing the hardware resources in the DPEs, in this embodiment, the trusted entity can assign each pipeline 600 to a respective tenant. That is, the data for Tenant A is processed only by the pipeline 600A, while the data for Tenant B is processed only by the pipelines 600B and 600O. Thus, the data for Tenant B has twice the processing bandwidth than the data for Tenant A. In this manner, each DPE 120 can be dedicated or assigned to one tenant. Doing so solves the noisy and nosy neighbor problems since each pipeline 600 is restricted to a single tenant. Further, one tenant can be prioritized over another tenant by assigning more pipelines to a higher priority tenant (Tenant B in this example).

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A multi-tenant aware data processing unit (DPU), comprising:
    a first tag gateway configured to couple to a host;
    a second tag gateway configured to couple to a network, wherein the first and second tag gateways are configured to assign different tags to data received from different tenants; and
    a plurality of data processing engines (DPEs) disposed between the first and second tag gateways to facilitate communication between the first and second tag gateways, the plurality of DPEs configured to enforce different tag policies, based on the different tags, when processing the received data.

2. The DPU of claim 1, wherein the data is received at the first tag gateway using a first communication protocol that is different from a second communication protocol used by data received at the second tag gateway.

3. The DPU of claim 2, wherein the first tag gateway is configured to evaluate a first attribute associated with the first communication protocol when assigning the tags and the second tag gateway is configured to evaluate a second attribute associated with the second communication protocol when assigning the tags, wherein a first value of the first attribute and a second value of the second attribute are associated with the same tag to indicate the first and second values are associated with a same tenant.

4. The DPU of claim 1, wherein the tags provide an end-to-end binding through the DPU, such that for a particular tag, the plurality of DPEs enforce a same tag policy.

5. The DPU of claim 1, wherein the tags are non-spoofable and cannot be changed by the plurality of DPEs, wherein a first portion of the tags are trusted tags and a second portion of the tags are untrusted tags by the plurality of DPEs.

6. The DPU of claim 1, further comprising:
    a trusted entity configured to (i) establish tag bindings in the first and second tag gateways that are used to assign tags to received data and (ii) configure the different tag policies in each of the plurality of DPEs.

7. The DPU of claim 1, wherein the plurality of DPEs comprises respective wrappers that enforce the different tag policies.

8. The DPU of claim 1, wherein the different tag policies indicate that a first tenant is allocated a greater maximum share of hardware resources in a first DPE of the plurality of DPEs than a second tenant.

9. The DPU of claim 1, wherein the different tag policies indicate that a first tenant is allocated a greater number of dedicated DPEs of the plurality of DPEs than a second tenant.

10. The DPU of claim 1, wherein the DPU is implemented as a Smart Network Interface Controller (SmartNIC).

11. A multi-tenant aware data processing unit (DPU), comprising:
    a first tag gateway coupled to a local interface of the DPU;
    a second tag gateway coupled to a remote interface of the DPU, wherein the first and second tag gateways are configured to assign different tags to data received from different tenants at the DPU; and
    a plurality of data processing engines (DPEs) disposed between the first and second tag gateways to facilitate communication between the first and second tag gateways, the plurality of DPEs configured to enforce different tag policies, based on the different tags, when processing the received data in order to (i) isolate data received from different tenants and to (ii) ensure performance standards for the tenants are met.

12. The DPU of claim 11, wherein the data is received at the first tag gateway using a first communication protocol that is different from a second communication protocol used by data received at the second tag gateway.

13. The DPU of claim 12, wherein the first tag gateway is configured to evaluate a first attribute associated with the first communication protocol when assigning the tags and the second tag gateway is configured to evaluate a second attribute associated with the second communication protocol when assigning the tags, wherein a first value of the first attribute and a second value of the second attribute are associated with the same tag to indicate the first and second values are associated with a same tenant.

14. The DPU of claim 11, wherein the tags provide an end-to-end binding through the DPU, such that for a particular tag, the plurality of DPEs enforce a same tag policy.

15. A method, comprising:
    receiving data from a plurality of tenants at a first tag gateway of a data processing unit (DPU);
    assigning different tags to the data received from different ones of the plurality of tenants; and
    enforcing different tag policies as the tagged data from the plurality of tenants is processed by data processing engines (DPEs) in the DPU, the DPEs disposed between the first and second tag gateways to facilitate communication between the first and second tag gateways.

16. The method of claim 15, further comprising:
    receiving data from the plurality of tenants at a second tag gateway of the DPU;
    assigning, by the second tag gateway, different tags to the data received from different ones of the plurality of tenants, wherein the data is received at the first tag gateway using a first communication protocol that is different from a second communication protocol used by data received at the second tag gateway.

17. The method of claim 16, wherein the first tag gateway evaluates a first attribute associated with the first communication protocol when assigning the tags and the second tag gateway evaluates a second attribute associated with the second communication protocol when assigning the tags, wherein a first value of the first attribute and a second value of the second attribute are associated with the same tag to indicate the first and second values are associated with a same tenant.

18. The method of claim 15, wherein the tags provide an end-to-end binding through the DPU, such that for a particular tag, the DPEs enforce a same tag policy.

19. The method of claim 15, wherein the tags are non-spoofable and cannot be changed by the DPEs.

20. The method of claim 15, further comprising:
 establishing, using a trusted entity, tag bindings in the first tag gateway that are used to assign tags to the received data; and
 configuring, using the trusted entity, the different tag policies in each of the DPEs.

\* \* \* \* \*